No. 612,461. Patented Oct. 18, 1898.
J. ROSER.
CORN PLANTER.
(Application filed June 7, 1898.)
(No Model.) 2 Sheets—Sheet 1.

Inventor
Jacob Roser,
Witnesses
by H. B. Willson & Co
Attorneys

No. 612,461. Patented Oct. 18, 1898.
J. ROSER.
CORN PLANTER.
(Application filed June 7, 1898.)
(No Model.) 2 Sheets—Sheet 2.

Witnesses Inventor
Jacob Roser,
by H. B. Willson & Co
Attorneys

UNITED STATES PATENT OFFICE.

JACOB ROSER, OF WASHINGTON, KENTUCKY.

CORN-PLANTER.

SPECIFICATION forming part of Letters Patent No. 612,461, dated October 18, 1898.

Application filed June 7, 1898. Serial No. 682,805. (No model.)

*To all whom it may concern:*

Be it known that I, JACOB ROSER, a citizen of the United States, residing at Washington, in the county of Mason and State of Kentucky, have invented certain new and useful Improvements in Corn-Planters; and I do declare the following to be a full, clear, and exact description of the invention, such as will enable others skilled in the art to which it appertains to make and use the same.

The invention has relation to corn-planters; and the object is to simplify the construction and to provide a machine of this character that will perform its work in an efficient manner.

With this object in view the invention consists in certain features of construction and combination of parts, which will be hereinafter fully described and claimed.

Figures 1, 4:
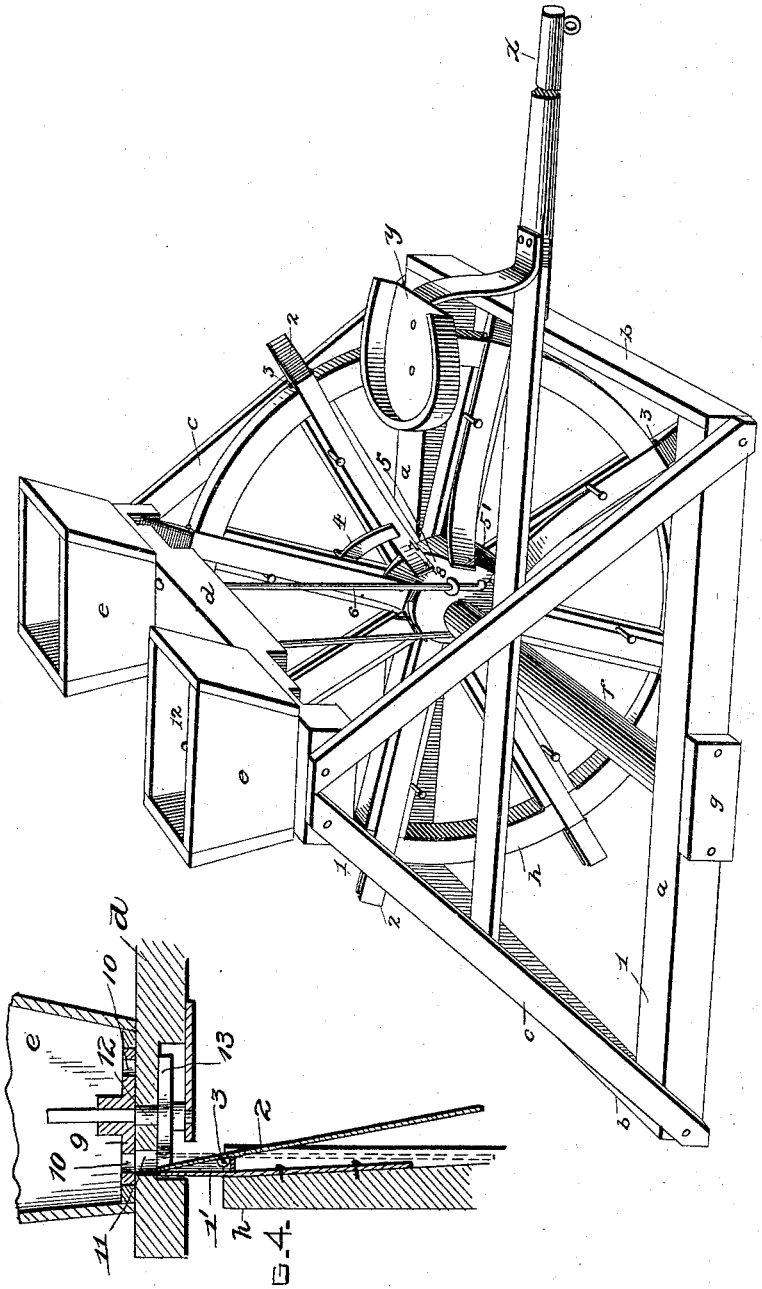
Figure 2:
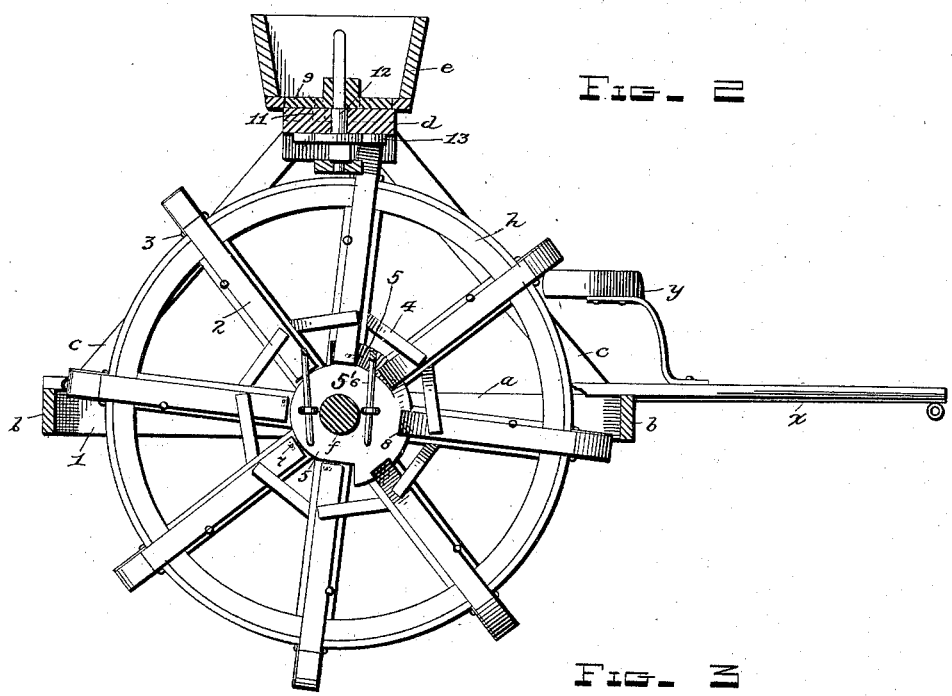
Figure 3:
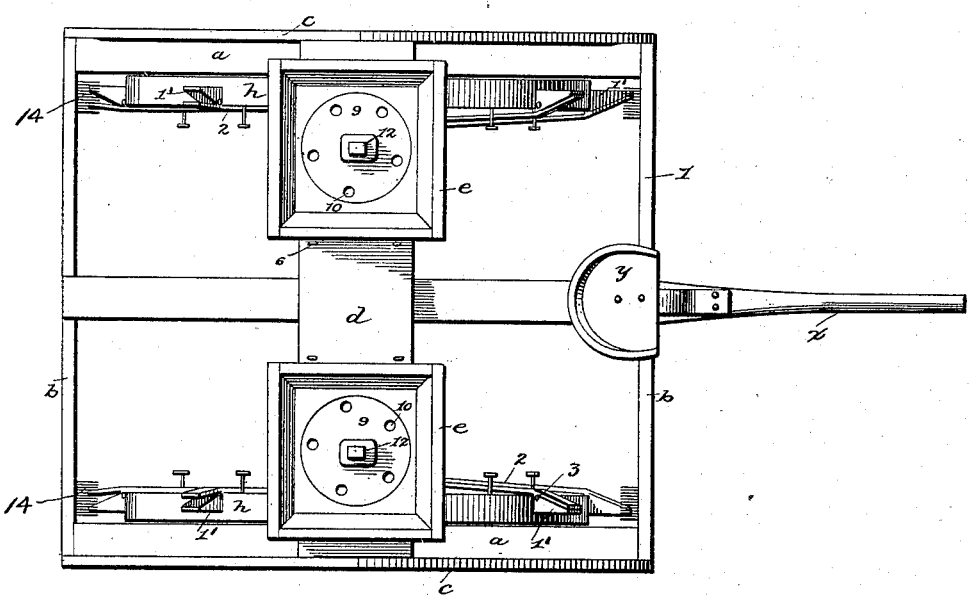

In the drawings, Figure 1 is a perspective view of my improved corn-planter with the near wheel removed. Fig. 2 is a vertical longitudinal section through one of the hoppers. Fig. 3 is a top plan view. Fig. 4 is a vertical transverse section through one of the drills and star-wheel.

In the drawings, 1 denotes the frame of the machine, which is preferably rectangular, and consists of the side pieces $a\,a$, the end pieces $b\,b$, the inclined pieces $c\,c$, and the cross-piece $d$, connecting the upper ends of the inclined pieces and serving to support the seed-boxes $e$.

$f$ denotes the axle journaled in the boxes $g$, and $h$ denotes the supporting-rings fixed to the spokes, which in turn are secured to said axle. The tires of these supporting-wheels are broad, and the spokes of the wheels are formed with longitudinal recesses, which communicate with apertures in the tires. Located in the recesses of the spokes and extending through the apertures of the tires are what I will term a "combined dropper and drill," or, in other words, a dropper-drill. Each of the dropper-drills consists of two parts 1' and 2, the part 1' being fixed in the recesses of the spokes and the part 2 being pivoted to the part 1 at the point 3 and having its rear end extending inwardly toward the axle and normally held against the spoke by the spring 4, thus keeping the outer end of the dropper-drill closed. 5 denotes the cams, formed integral with the cylindrical blocks 5', which embrace the axle, but are held against rotation by the arm 6, depending from the cross-piece $d$. These cams are adapted to be engaged by the rotation of the wheels and by rollers 7, journaled upon flanges 8 at the inner ends of the parts 2 of the dropper-drill, so that by the rotation of the wheels the dropper-drill will be opened and closed by the action of the spring 4—opened to receive the corn or seed from the box, closed as the wheel rotates and the dropper-drill is forced into the ground, and opened while the drill is in the ground for the purpose of discharging the seed.

Located in the bottom of the seedboxes are seed disks or valves 9, having the usual seed perforations 10, which are adapted to be brought into register with the aperture 11 in the cross-piece $d$ and allow the seed to drop through said aperture. A stud-shaft 12 extends through the cross-piece and is connected with the seed-disk and is provided at its lower end with a star-wheel 13, which is adapted to be engaged and rotated by the dropper-drills as they pass under the cross-bar. The arrangement is such that at the instant the dropper-drill engages one of the teeth of the star-wheel and rotates it the mouth of the dropper-drill will be held open by its cam, thus permitting the seed that drops through the aperture in the cross-piece to fall into the dropper-drill, and as the wheel continues to rotate the inner end of the hinged section of the dropper-drill will free itself from the cam. The inner end of the hinged section of the dropper-drill will ride up over the enlarged portion of the cam and close the discharge end of the dropper-drill to prevent the seed falling out. Further rotation of the wheel will bring the dropper-drill into engagement with the ground, and at this instant the inner end of the hinged section and of the dropper-drill will free itself from engagement with the cam and the spring will force the inner end of the hinged section against the spoke and open the outer end, thus discharging the seed into the ground.

In order to prevent the dirt accumulating or remaining in the discharge end of the dropper-drill after it has discharged its seed, I provide the rear cross-piece or any other suitable portion of the frame with brushes or scrapers 14, arranged within the path of movement of the open ends of the dropper-drills, so that any dirt which may adhere to or accumulate within the dropper-drill will be removed, thus preventing the clogging of parts.

If desired, this machine may be coupled with a similarly-constructed machine by a tumbling-shaft, but as this is nothing more or less than a duplication of parts I do not deem it necessary to either illustrate or describe the construction in detail.

$x$ represents the tongue of the machine, and $y$ the driver's seat.

It is essential that some means be provided to vary the tension of the springs, so that in working in hard ground the springs will have sufficient energy to force the hinged section of the dropper-drill away from the stationary section in order to allow of the discharge of the seed. For this reason I have made the spring adjustable, thereby enabling me to increase or diminish its tension, as the case may require.

Changes in the form, proportion, and the minor details of construction may be resorted to without departing from the principle or sacrificing any of the advantages of my invention.

Having thus described my invention, what I claim as new, and desire to secure by Letters Patent, is—

In combination, the frame, the axle, the supporting-wheels mounted thereon, dropper-drills carried by said wheels, seedboxes mounted one above each of said wheels, a horizontal seed feed-disk mounted within each box, a star-wheel mounted parallel with said feed-disks outside of said boxes and in the path of the outer end of said dropper-drills, the cylindrical blocks 5' encompassing said axle and formed with the cam-face 5, and the arm 6 connecting the blocks and frame, substantially as set forth.

In testimony whereof I have hereunto set my hand in presence of two subscribing witnesses.

JACOB ROSER.

Witnesses:
L. H. BELFRY,
DELIA BELFREY.